United States Patent
White

(10) Patent No.: US 6,663,119 B2
(45) Date of Patent: Dec. 16, 2003

(54) SPORTS EQUIPMENT CART

(76) Inventor: Larry J. White, 739 Emerald Dr., Lindsborg, KS (US) 67456

( * ) Notice: Subject to any disclaimer, the term of this patent is extended or adjusted under 35 U.S.C. 154(b) by 231 days.

(21) Appl. No.: 09/944,997

(22) Filed: Aug. 31, 2001

(65) Prior Publication Data

US 2003/0042696 A1 Mar. 6, 2003

(51) Int. Cl.$^7$ ............................................. B62B 1/100
(52) U.S. Cl. ............................. 280/47.26; 280/47.131
(58) Field of Search .................. 280/DIG. 6, 47.26, 280/47.34, 47.35, 47.131, 47.19; 224/274, 919; 206/315.1, 315.3, 315.5; 220/476, 480, 481; 248/224.31, 224.41, 225.21, 692; 211/85.7, 85.8, 13.1, 15, 14; D34/25; 294/137; 473/569

(56) References Cited

U.S. PATENT DOCUMENTS

| | | | | |
|---|---|---|---|---|
| 1,419,093 A | * | 5/1922 | Parmater | ..................... 116/33 |
| 2,590,154 A | | 3/1952 | Burns | |
| 2,756,901 A | * | 7/1956 | Cowsert | ..................... 211/14 |
| 3,010,775 A | | 11/1961 | Giovannelli | |
| 3,064,823 A | * | 11/1962 | Shock. | ..................... 200/85.7 |
| 3,164,393 A | | 1/1965 | Upham, II | |
| 3,371,795 A | | 3/1968 | Rosonke | |
| 3,869,137 A | | 3/1975 | Byrom | |
| 3,876,223 A | | 4/1975 | O'Reilly et al. | |
| 4,227,710 A | | 10/1980 | Laub | |
| 4,418,930 A | * | 12/1983 | Ryan, Jr. | ................. 280/47.19 |
| D272,481 S | * | 1/1984 | Balling | ........................ D34/24 |
| 4,561,547 A | | 12/1985 | Estwanik, III | |
| 4,854,456 A | | 8/1989 | Lee | |
| 4,936,467 A | | 6/1990 | Bobeczko | |
| 4,968,048 A | | 11/1990 | Lortie | |
| 5,074,571 A | | 12/1991 | Reese | |
| 5,085,327 A | | 2/1992 | Mercer, Jr. et al. | |
| 5,123,719 A | | 6/1992 | Oden | |
| D340,565 S | * | 10/1993 | Klopfenstein | ................. D34/25 |
| 5,273,298 A | | 12/1993 | Brown, Sr. et al. | |
| 5,573,122 A | | 11/1996 | Williams | |
| 5,667,082 A | | 9/1997 | Hamilton et al. | |
| 5,702,140 A | | 12/1997 | Radja | |
| 5,855,286 A | | 1/1999 | Zaid | |
| 5,975,293 A | | 11/1999 | Fowler | |
| 6,099,023 A | | 8/2000 | Be | |
| 6,138,841 A | | 10/2000 | Klein et al. | |
| 6,164,465 A | | 12/2000 | Schroeder | |
| 6,494,468 B1 | * | 12/2002 | Inge | ........................ 280/47.35 |

* cited by examiner

Primary Examiner—Brian L. Johsnon
Assistant Examiner—Gerald B Klebe
(74) Attorney, Agent, or Firm—Dale J. Ream

(57) ABSTRACT

A sports equipment cart consisting of a ball dispensing tube having an upper end, a lower end, a hollow bore extending from the upper end to the lower end, an upper ball receiving aperture, and a lower ball dispensing aperture; left and right wheels; and an axle extending through the side walls of the ball dispensing tube at its lower end, the left and right wheels being rotatably mounted upon opposing left and right ends of said axle.

6 Claims, 4 Drawing Sheets

SPORTS EQUIPMENT CART

FIELD OF THE INVENTION

This invention relates to rollable carts adapted for storage and transportation of sports equipment such as balls, bats, tennis rackets, and the like. More particularly, this invention relates to such carts which are further adapted for dispensation of sports play balls.

BACKGROUND OF THE INVENTION

Rollable carts adapted for storage and transportation of sports equipment are known. Where a rollable sports equipment cart is particularly adapted for simultaneous storage and transportation of several different types of balls, bats, ball gloves, tennis rackets, and other sports equipment, such sports equipment cart typically is heavy, unwieldy, mechanically complex, and is uneconomically constructed.

The instant inventive sports equipment cart solves or ameliorates the above problems and deficiencies by incorporating a preferred polyvinyl chloride plastic (PVC) pipe or tube as the primary structural element of the cart, such tube performing multiple functions, including rollable carriage of balls, ball storage, and dispensation of balls.

BRIEF SUMMARY OF THE INVENTION

The primary structural component of the instant inventive sports equipment cart comprises an open ended, substantially vertically oriented, tube or pipe. Preferably, the tube or pipe is an extruded polyvinyl chloride plastic pipe having a common ten inch nominal pipe size with a 9.976 inch inside diameter and a 10.75 inch outside diameter. Such inside diameter allows the tube to freely receive sports balls such as regulation basketballs and soccer balls. Suitably, such tube may be alternately composed of injected molded plastic, rotationally molded plastic, tube rolled cardboard, molded fiberglass, or rolled sheet metal crimp jointed or riveted at the seam. Suitably, though less desirably, extruded metal piping may be utilized.

The preferred extruded PVC ten inch nominal size tube is preferably three feet to four feet in height, has an open upper end, has an open and angularly back cut lower end, and has a saddle shaped ball dispensing aperture through the front end of its lower side wall, such aperture being of a size sufficient to allow outward dispensation of sports balls such as basketballs, footballs, and soccer balls from the hollow bore of the tube.

Preferably, a solid axle extends laterally through the lower end of the preferred PVC tube from its left side to its right side, and left and right wheels are preferably rotatably mounted upon the protruding left and right ends of said axles. The wheels and axle are preferably positioned so that the wheels extend downwardly approximately one-fourth inch from the lower end of the tube and so that the wheels extend rearwardly from the angular back cut. Suitably, less desirably, left and right fixedly attached post or stub axles may extend in a cantilevered fashion from the left and right sides of the lower end of the preferred PVC tube. Where the preferred laterally extending solid axle is utilized, such axle advantageously dually serves as a slide stop, positioning sports balls for dispensation through the ball dispensing aperture, and as the wheel rotatable mounting means. Where post or stub axles are utilized, a floor or other slide stopping means is necessarily provided.

The rearward upper end of the side wall of the preferred PVC tube preferably has a laterally oblongated hand hold aperture for convenient manual pushing or pulling of the sports equipment cart. Suitably, a cantilevered handle may be fixedly attached to the annular outer surface of the tube at its upper rearward end.

Preferably, a plurality of secondary ball dispensing tubes of varying nominal sizes smaller than that of the primary tube, fixedly attached to the annular outer surface of the primary tube. Like the primary tube, such secondary tubes are preferably composed of polyvinyl chloride plastic, and are configured substantially identically with the primary tube. In place of the preferred slide stopping axle of the primary tube. A slide stopping rods preferably extend through the lower ends of such secondary ball dispensing tubes. The secondary ball dispensing tubes serve the function of storage and dispensation of smaller balls such as tennis balls, baseballs, and softballs.

The edge surfaces of the primary tube and the secondary tubes are each preferably lined and reinforced with adhesively attached flexible "C" channel trim. Suitably, all such edges may be trimmed with a half round router driven bit.

Preferably, a variety of types of sports equipment hanging brackets and hooks are attached to the annular outer surface of the primary tube. For example, "C" brackets fabricated from short lengths of two inch PVC tubing may be fixedly attached to the annular outer surface of the primary tube by spirally threaded bolts and nuts; such brackets being utilized for storage and dispensation of baseball and softball bats. As another example, hooks and brackets commonly utilized in conjunction with work shop peg boards may be removably and adjustably mounted upon the primary tube, such mounting being facilitated through provision of one-eighth inch to one-fourth inch side wall apertures configured similarly with those of a common peg board.

Accordingly, it is an object of the present invention to provide a mechanically simple and economically constructed sports equipment carrying cart.

It is a further object of the present invention to provide such a cart incorporating a primary tube adapted to serve multiple functions including ball storage, ball dispensation, and as a rollable cart frame.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
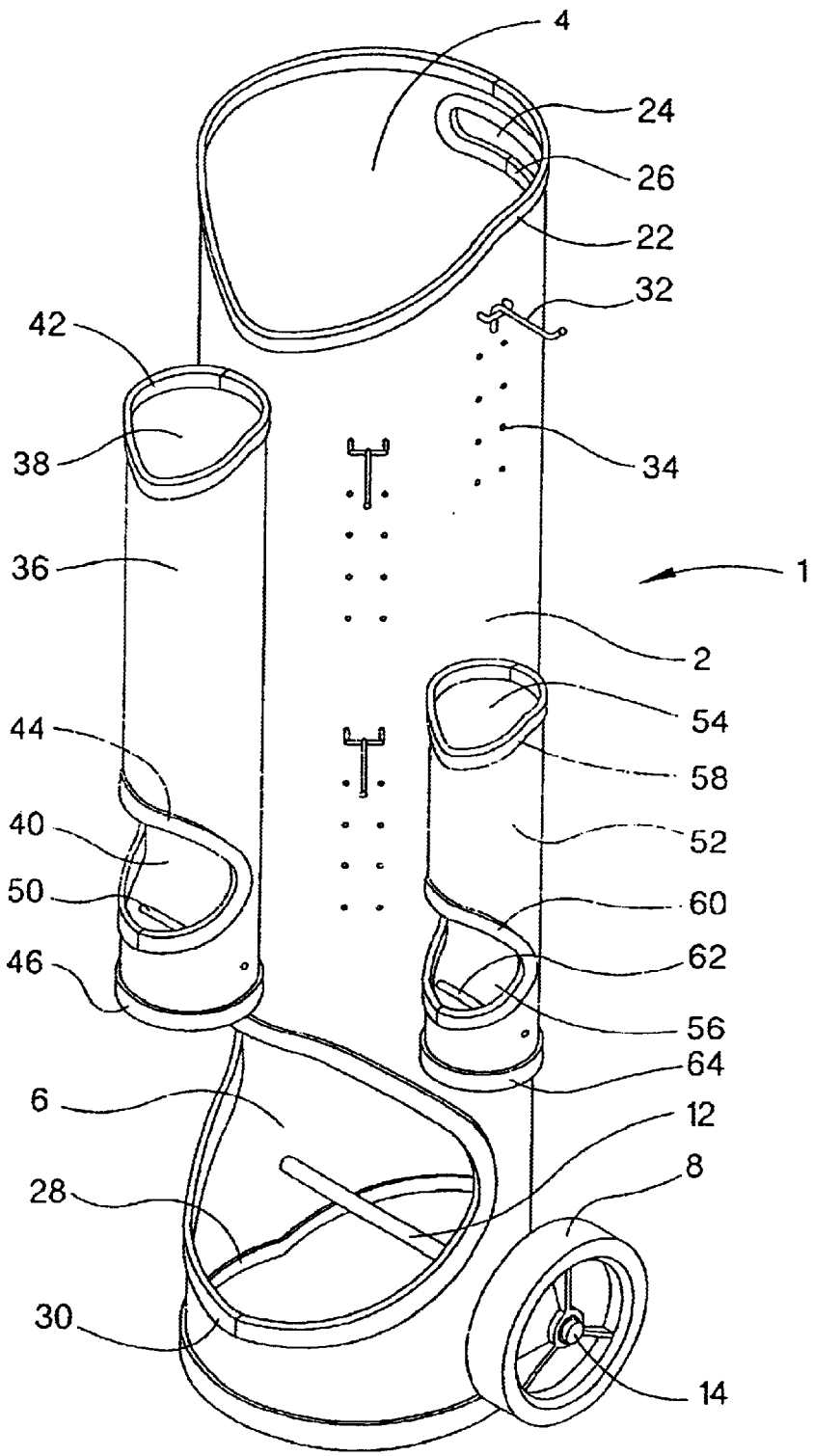
FIG. 1 is an isometric view of the instant inventive sports equipment cart.
Figure 2:
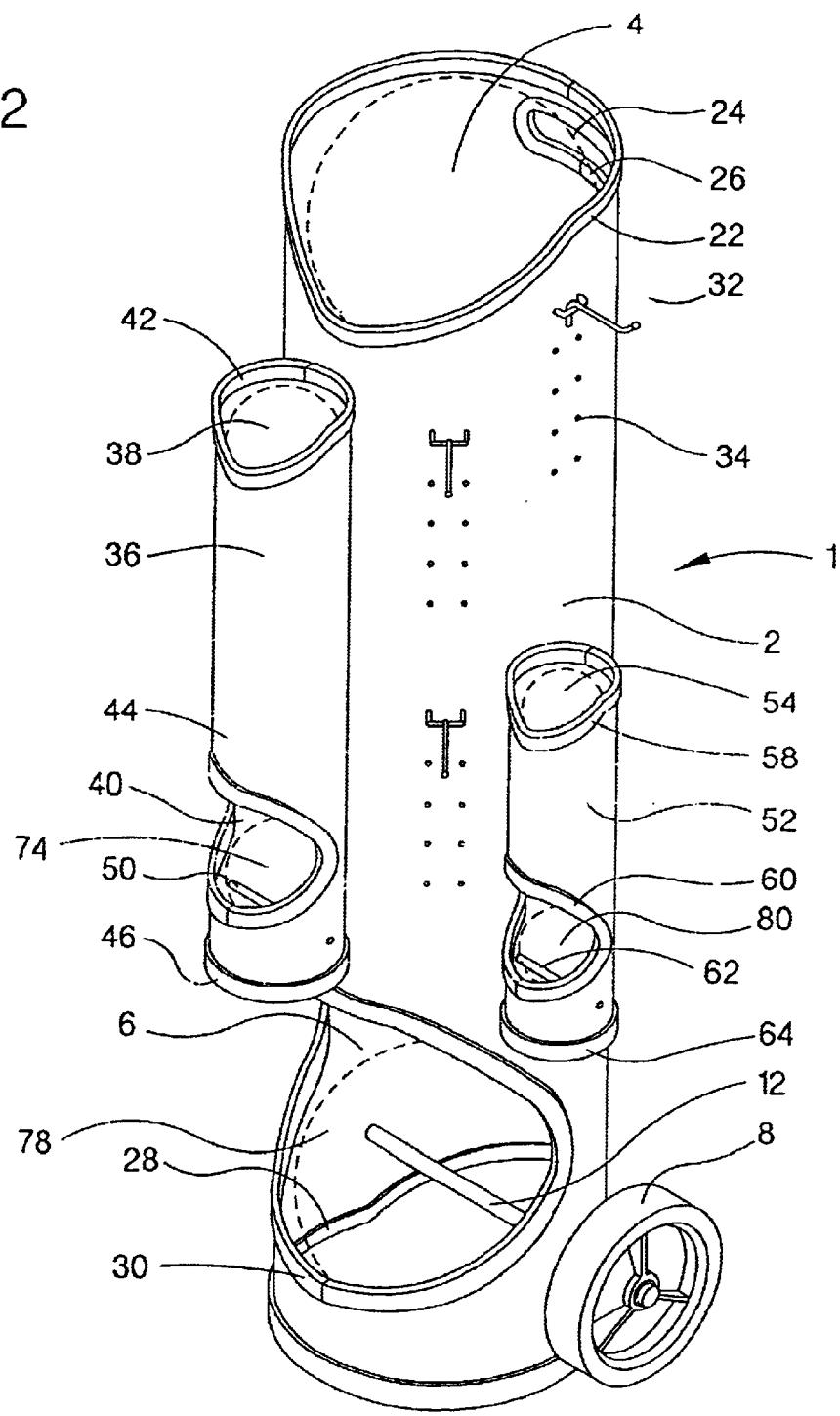
FIG. 2 redepicts FIG. 1 showing the inventive article in use for dispensation of sports play balls.
Figure 3:
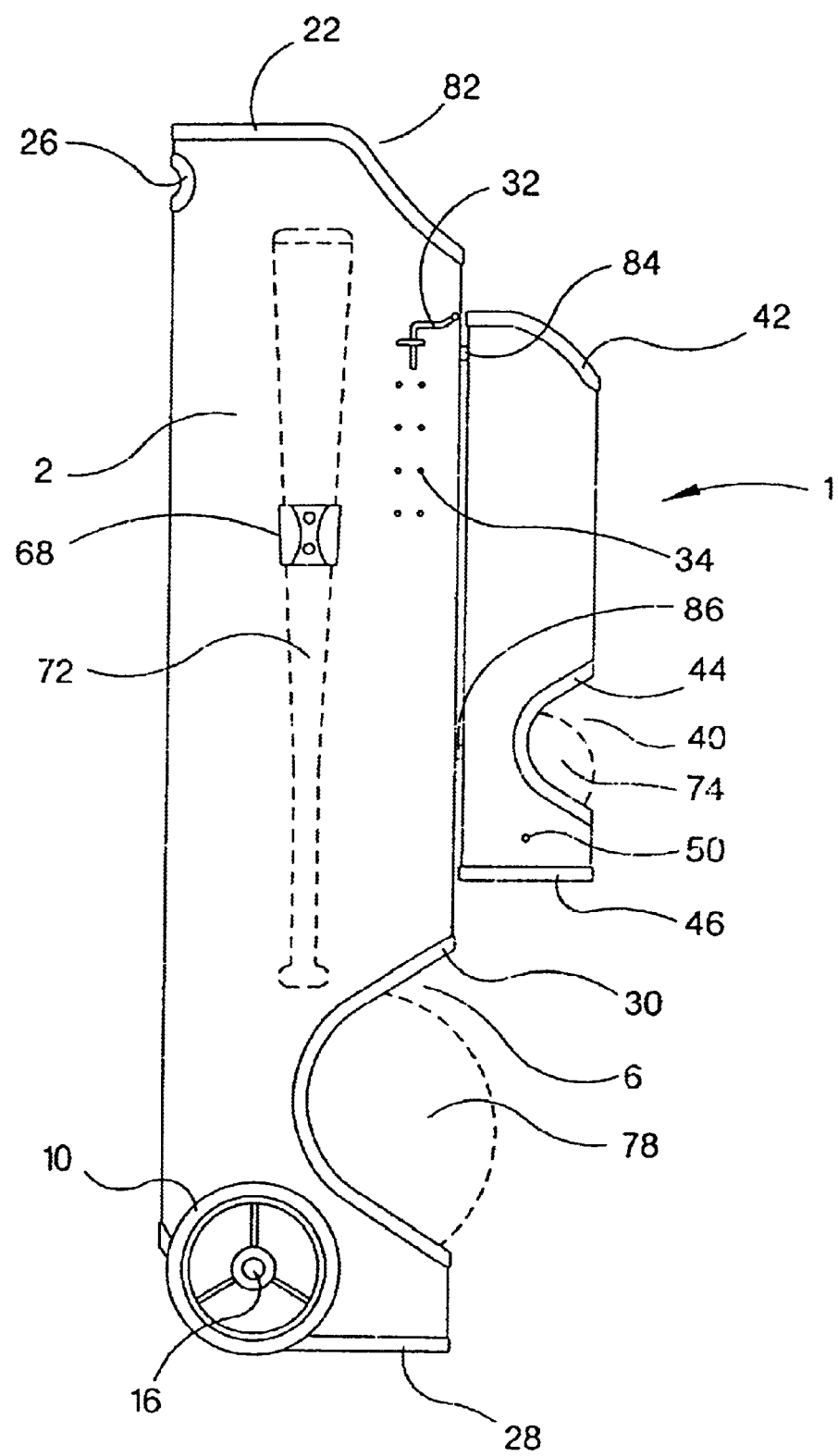
FIG. 3 is a side view of the sports equipment cart.

Referring now to the drawings, and in particular to FIG. 1, the instant inventive sports equipment cart is referred to generally by reference arrow 1. A major structural component of the sports equipment cart 1 comprises a primary tube 2, preferably fabricated from polyvinyl chloride plastic tubing. The primary tube 2 has an upper ball receiving opening 4, and a lower saddle shaped ball dispensing aperture 6. Preferably, said upper and lower apertures 4 and 6 are lined with flexible "C" channel trim 22 and 30. The upper end of primary tube 2 preferably has a laterally oblongated aperture 24, lined by flexible "C" channel trim 26, said aperture 24 serving as a mechanically simple and economically constructed hand hold or manual pulling means. Referring simultaneously to FIGS. 1, 2 and 3, the rearward end of the lower edge of primary tube 2 is preferably back out, facilitating rearward tilting or pivoting of the cart 1 about wheels 8 and 10, said lower edge preferably being lined by flexible "C" channel trim 28.

Referring again to FIG. 1, the side wall of the primary tube 1 preferably has a multiplicity of peg receiving apertures 34, such apertures 34 being sized and positioned similarly with those of a common workshop peg board. Hook brackets 32 are removably mounted within apertures 34, and are thereby adjustably positionable. Numerous types of sports equipment such as baseball gloves (not depicted) and tennis rackets (not depicted) are storable upon hook brackets 32.

Referring to FIG. 3, a tubular "C" bracket 68, preferably composed of PVC plastic, is representative of numerous other specially constructed sports equipment hanging brackets which may be fixedly attached applied to the side walls of primary tube 2.

The representative "C" bracket 68 conveniently stores and dispenses a baseball bat 72.

Figure 4:
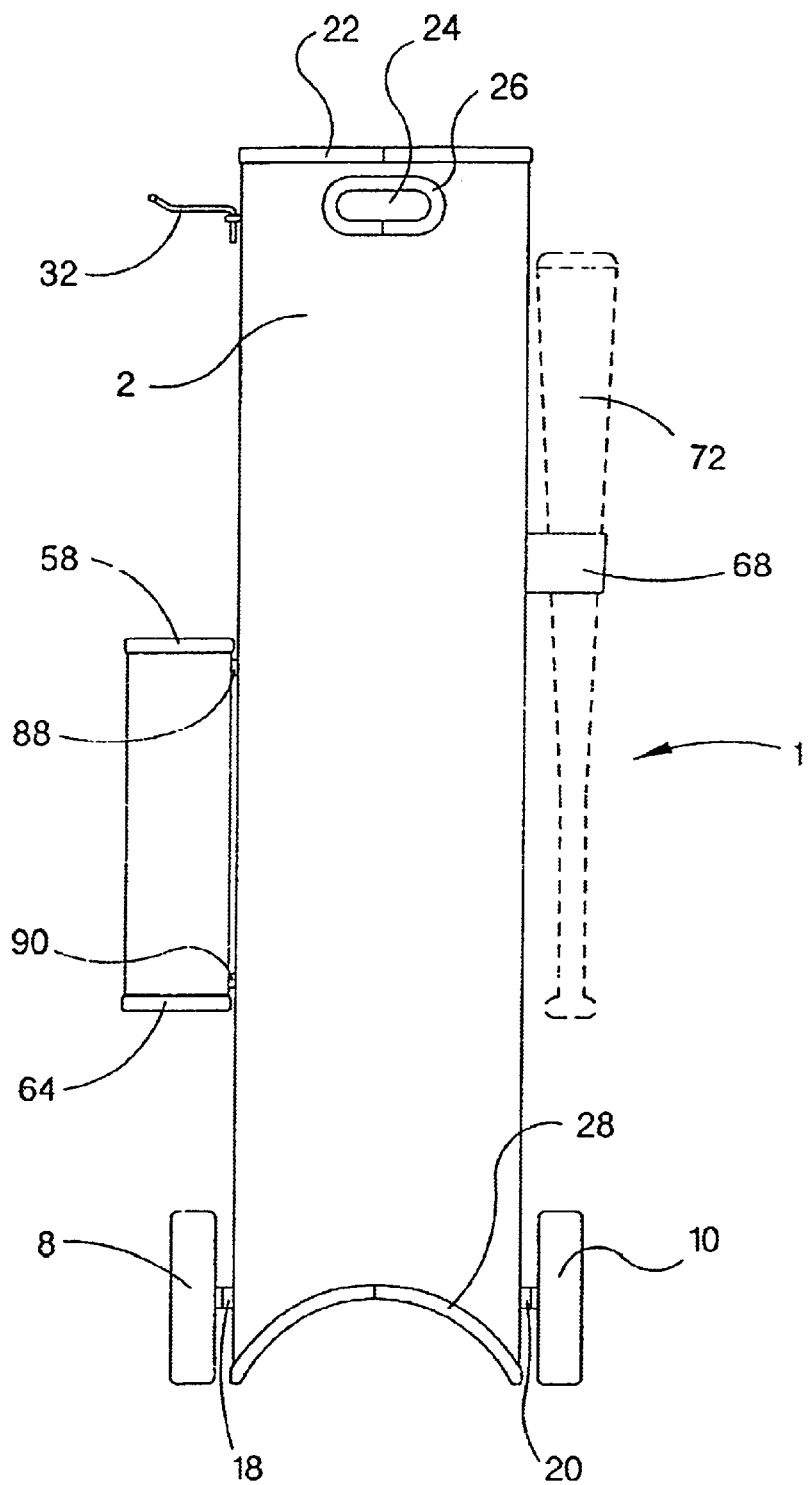
FIG. 4 is a rear view of the sports equipment cart.

Referring again to FIG. 1, smaller sized secondary tubes 36 and 52 are preferably fixedly attached to the annular outer surface of primary tube 1. Referring simultaneously to FIGS. 3 and 4, ring spacers 84, 86, 88 and 90 preferably receive spirally threaded nut and bolt combinations (not depicted in view) for fixed attachment of the secondary tubes 36 and 52 to the primary tube 2. Referring again to FIG. 1, the secondary tubes 36 and 52 are configured substantially identically with the primary tube 2; they having upper openings 38 and 54, lower saddle shaped ball dispensing apertures 40 and 56, and having slide stopping crossbars 50 and 62. Like the primary tube 1, all exposed edges of secondary tubes 36 and 52 are preferably covered with flexible "C" channel trim pieces 42, 44, 46, 58, 60, and 64.

Referring simultaneously to FIGS. 1 and 4, a solid axle 12 extends laterally through the lower end of primary tube 2.

Spacers 18 and 20 are slidably mounted over the protruding left and right ends of axle 12 for outward spacing of left and right wheels 8 and 10. Referring simultaneously to FIGS. 1 and 3, lock caps 14 and 16 are securely driven over opposing ends of axle 12, the lock caps holding in place the left and right wheels 8 and 10 along with axle 12.

In use of the instant inventive sports equipment cart, referring to FIG. 2, larger sports balls such as basketballs, four square balls, and soccer balls 78 are stored within the interior bore of primary tube 2, axle 12 serving as a slide stop preventing such balls from slidably moving through the lower end of primary tube 2. Baseballs or softballs 74 are stored within the hollow interior bore of secondary tube 36, crossbar 50 preventing such balls from falling through the lower end of said tube. Similarly, tennis balls 80 are stored within the hollow bore of the smallest secondary tube 52, crossbar 62 preventing tennis balls 80 from falling completely therethrough. In use, upon pulling a ball out of any of saddle shaped apertures 6, 40, or 56, the next successive balls stored above falls into place upon crossbar 50, 12, or 62, such ball being ready for dispensation. Upon rearward tilting of cart 1, wheels 8 and 10 contact the ground, facilitating rolling transportation of the entire assembly.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A. sports equipment cart comprising:
   (a) a first ball dispensing tube having an upper end, a lower end, a hollow bore extending from said upper end to said lower end, an upper ball receiving aperture, and a lower ball dispensing aperture;
   (b) left and right wheels;
   (c) rotatable mounting means interconnecting said left and right wheels with said lower end of said first ball dispensing tube, wherein said rotatable mounting means comprises a solid axle interconnecting said left and right wheels with said lower end of said first ball dispensing tube, said solid axle being positioned to function as a slide stop;
   (d) wherein said first ball dispensing tube includes a side wall, said lower ball dispensing aperture extending through said side wall; and
   (e) a second ball dispensing tube fixedly attached to said side wall of said first ball dispensing tube.

2. The sports equipment cart of claim 1 further comprising manual pulling means fixedly attached to or integral with the upper end of the first hair dispensing tube.

3. The sports equipment cart of claim 2 wherein the manual pulling means comprises a handle or a side wall aperture.

4. The sports equipment cart of claim 3 wherein the first ball dispensing tube comprises a material selected from the group of extruded plastic tubing, injection molded plastic tubing, rotationally molded plastic tubing, tube rolled cardboard, fiberglass tubing, rolled sheet metal tubing, and extruded metal tubing.

5. The sports equipment cart of claim 4 further comprising a plurality of sports equipment hanging hocks or brackets fixedly and removedly attached to the annular outer surface of the side wall of the first ball dispensing tube.

6. A sports equipment cart, comprising:
   a) a first ball dispensing tube having an upper end, a lower end, a hollow bore extending from said upper end to said lower end, an upper ball receiving aperture, and a lower ball dispensing aperture;
   b) left and right wheels;
   c) a solid axle interconnecting said left and right wheels with said lower end of said first ball dispensing tube, said solid axle being positioned to function as a slide stop;
   d) wherein said first ball dispensing tube includes a side wall, said lower ball dispensing aperture extending through said side wall;
   e) a second ball dispensing tube fixedly attached to said side wall of said first ball dispensing tube, said second ball dispensing tube having a diameter smaller than a diameter of said first ball dispensing tube.

* * * * *